United States Patent
Koll

(10) Patent No.: US 7,092,939 B2
(45) Date of Patent: Aug. 15, 2006

(54) INTERACTIVE STREAMING TICKER

(75) Inventor: Matthew B. Koll, Bethesda, MD (US)

(73) Assignee: Wondir General, Inc., Washington, DC (US)

( * ) Notice: Subject to any disclaimer, the term of this patent is extended or adjusted under 35 U.S.C. 154(b) by 78 days.

(21) Appl. No.: 10/373,696

(22) Filed: Feb. 27, 2003

(65) Prior Publication Data

US 2004/0172384 A1 Sep. 2, 2004

(51) Int. Cl.
 *G06F 7/00* (2006.01)
 *G06F 17/30* (2006.01)
(52) U.S. Cl. .............................. 707/4; 707/10; 707/101
(58) Field of Classification Search ..................... 707/3, 707/10, 101, 2, 4; 705/26
 See application file for complete search history.

(56) References Cited

U.S. PATENT DOCUMENTS

| | | | | |
|---|---|---|---|---|
| 6,055,538 | A * | 4/2000 | Kessenich et al. .......... | 707/101 |
| 6,256,631 | B1 * | 7/2001 | Malcolm ...................... | 707/10 |
| 6,278,993 | B1 * | 8/2001 | Kumar et al. .................. | 707/3 |
| 6,484,149 | B1 * | 11/2002 | Jammes et al. ................ | 705/26 |
| 6,601,066 | B1 * | 7/2003 | Davis-Hall ..................... | 707/5 |
| 6,721,748 | B1 * | 4/2004 | Knight et al. .................. | 707/10 |
| 6,727,930 | B1 * | 4/2004 | Currans et al. ............. | 715/864 |
| 6,745,161 | B1 * | 6/2004 | Arnold et al. .................. | 704/7 |
| 6,748,385 | B1 * | 6/2004 | Rodkin et al. ................. | 707/10 |
| 6,751,612 | B1 * | 6/2004 | Schuetze et al. ............... | 707/4 |
| 2003/0208472 | A1 * | 11/2003 | Pham ............................. | 707/2 |
| 2004/0066914 | A1 * | 4/2004 | Crosson et al. ............... | 379/52 |
| 2004/0073809 | A1 * | 4/2004 | Keong et al. ................ | 713/201 |

OTHER PUBLICATIONS

U.S. Appl. No. 10/027,383, Method and System for Native-Byte Form Handling, Eric White, Dec. 21, 2001.*

* cited by examiner

*Primary Examiner*—Greta Robinson
*Assistant Examiner*—Kuen S. Lu
(74) *Attorney, Agent, or Firm*—Michael Bednarek; Pillsbury Winthrop Shaw Pittman LLP

(57) ABSTRACT

A method for posting and responding to a query is provided for enabling a first user to input the query to a system, converting the query to a hyperlink, adding the hyperlink to an interactive ticker for response, and enabling a second user to select a query from the ticker and respond to the first user by at least one of e-mail, instant message, and message board post.

20 Claims, 1 Drawing Sheet

INTERACTIVE STREAMING TICKER

BACKGROUND OF THE INVENTION

1. Field of the Invention

Embodiments of the present invention relate to an interactive streaming ticker. More particularly, embodiments of the present invention relate to a streaming ticker of hyperlinks input by a user where the hyperlinks represent a query to be answered by other users of the system.

2. Background Information

A wealth of information on almost every imaginable topic is now available through the Global Information Network or Internet. In most instances, if an internet user desires to find information he or she will go to a search engine, input search criteria, and receive a list of matching results for further investigation. Users may also post a query on a message board targeted to a specific area about which the user is interested. For example, a user who has a query about a certain type of vehicle may find a website of car enthusiasts for that particular vehicle and post a query to be answered by other users who frequent the site. While these and other information gathering techniques provide valuable results, often they require the user to wade through many irrelevant web pages and/or responses before finding one that satisfactorily provides the desired information. In addition, a user may have to wait days or even weeks to receive an answer when using a message board type system.

It would be desirable to have in place on the Internet a system for better connecting people with queries to people who may be able to answer those queries, possibly even with a real-time response.

SUMMARY OF THE INVENTION

The present invention provides a streaming ticker of hyperlinks that may be added to the stream by a user in order to post a question or otherwise request information in the form of a query for other users to respond to the question. Users who are connected to the system will be able to see a stream of queries that may be filtered according to various criteria. If a user sees a query to which he or she would like to respond, the user simply seclects the query. Selection may be, for example, by clicking a mouse, touching the screen with a pointer, voice activation, or any other suitable means for selecting a hyperlink known in the art. Once the user selects the query, he or she will have the ability to choose from one or more methods of responding to the original poster, for example via e-mail, by posting a response on a message board, or responding via instant message. Once the poster determines that he has received a suitable response, he may deactivate the hyperlink to prevent unnecessary additional responses.

According to one aspect of the invention a method for posting and responding to a query is provided comprising enabling a first user to input the query to a system, converting the query to a hyperlink, adding the hyperlink to an interactive ticker for response, and enabling a second user to select a query from the ticker and respond to the first user by at least one of e-mail, instant message, and message board post.

DETAILED DESCRIPTION OF THE INVENTION

Figure 1:
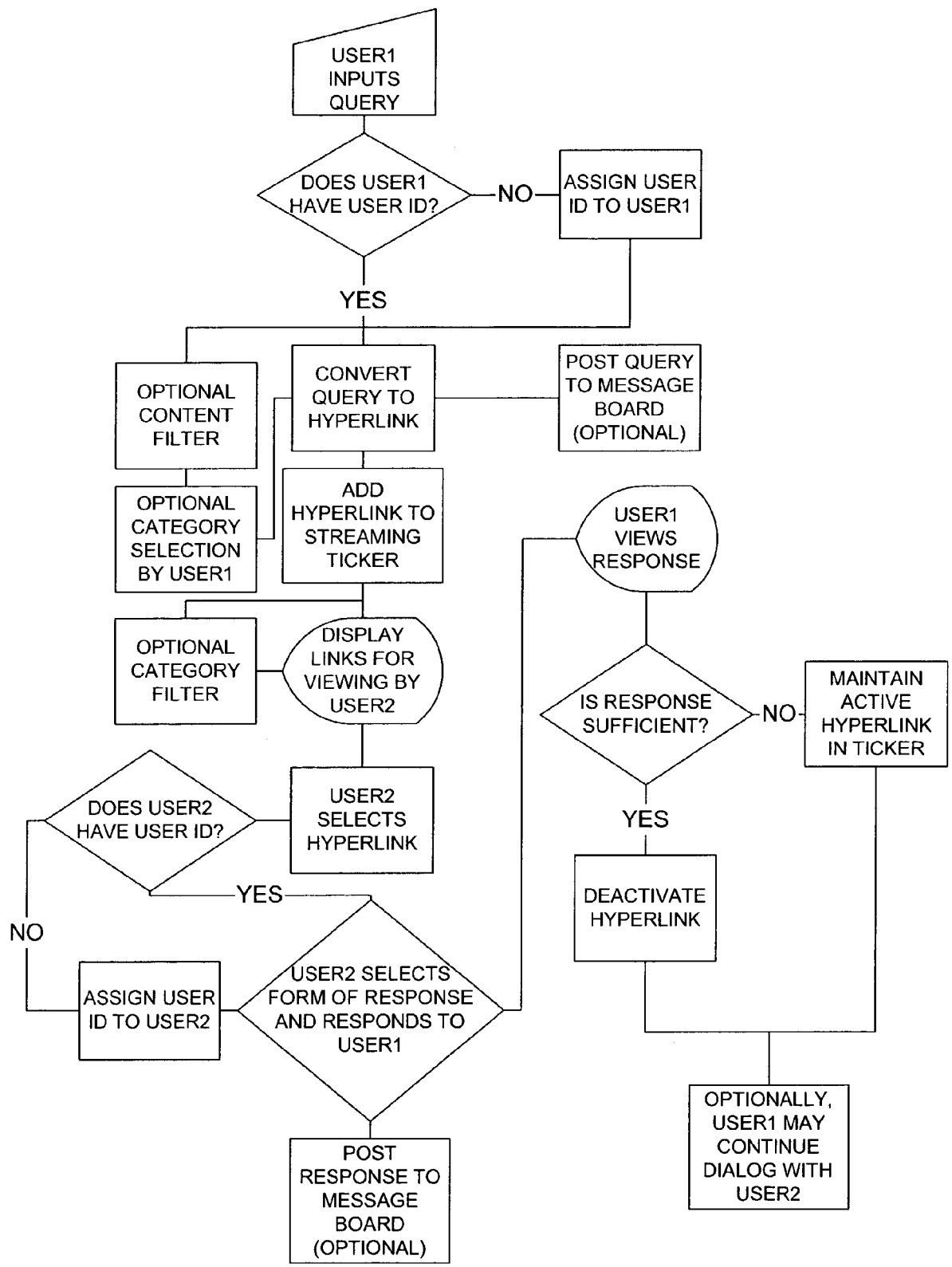
FIG. 1 is a flow chart showing the posting and response functions of the ticker system.

Embodiments of systems and methods related to an interactive streaming ticker are described in this detailed description of the invention. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

In accordance with an embodiment of the present invention, a user on a multi-user network, such as the internet, local area network (LAN), or other similar system, desires an answer to a query or is otherwise looking for information on a certain subject. The user is presented with an input box in which the query may be entered. Once input, the query is converted to a hyperlink and added to a streaming ticker of other user queries. Users who are connected to the ticker service may view the queries and select the proper hyperlink to provide their input or answer to the query. Users who post queries need not be connected to the system prior to posting a query. If a user has not previously logged in, he will be assigned a user identifier that will identify him for as long as he maintains his session on the ticker. This may be accomplished by downloading a small amount of code to the user's computer or other similar device so that the system can recognize him as an active user.

When a user posts a query, he has the capability of selecting one or more forms of response for other users to communicate their responses. The poster may activate all of the desired options or eliminate one or more as he chooses. For example, once the query is posted, the user may be prompted to select from a list of response modes such as: e-mail, message board posting, instant message, etc. When another user selects the hyperlink to respond, he will only receive the options specified by the original poster of the query. For example, if the questioner desires only responses by instant message, then potential responders will only have the option of replying by instant message. If, however, the questioner has selected multiple modes for responding, then the responder will have the ability to choose his desired form of response.

Regardless of user preference, however, all queries input along with their responses may be posted to a message board. The message board would be searchable to allow for users to review previous queries and answers either before or after posting a query to see if their query has already been asked and answered. Additionally, if a user does not get a response while he or she is connected to the system, by creating such a message board, the user would have the capability of returning at a later time to see if his or her query has been answered.

The broadcast stream of queries can be a true push broadcast over any medium, or it may consist of a web page that acts like a ticker by being updated continuously or very frequently as new items enter the system. The ticker may be on a server or it may be on a client device. The ticker could also be associated with an application such as a buddy list. For example, as users frequent the system, they may find certain users who are valuable sources of information on various topics. Users could create a list of these various other users and would know if any of them are online. Users would be notified if someone on his or her buddy list had posted a query so that they could respond. In this way, users can respond more quickly to people they have tabbed as "buddies" and people posting queries would know that such a notification would be sent to any of his buddies. If the ticker were on a client device (e.g. computer, PDA, phone, mobile messaging system, etc.), it could either receive a stream of links or regularly fetch a set of links for display.

Users who are connected to the system and are viewing the ticker may also have the capability of filtering the stream for specific types of queries. For example, a user could input his own search criteria so that only queries that include certain key words would appear in his ticker. In addition, when inputting a question, a user may be prompted to select from one or more categories to which the query pertains. Other users may then filter based on these predetermined categories so that they receive only queries within certain categories of their choosing.

Other filters, such as content screening could be used to filter out queries containing obscene language by means known by those skilled in the art. In accordance with the content screening, the system could be divided into adult and general audience sections so that persons posting queries not suitable for children would be directed to the adult section. In addition, users may be given the ability to strike inappropriate queries from the ticker as they see fit such that the ticker would be self-policing. Queries that are stricken in this manner would not just be removed from that user's ticker, but would be removed from the ticker and/or message board altogether.

An example of an embodiment of the method as disclosed herein is shown in FIG. 1. As is seen, a first user, USER1, inputs a query into a dialog box shown on the screen of his computer, PDA, etc. The system then checks to see if the user is logged in and either proceeds or assigns the user an identification tag for use during that session. The query is then converted to a hyperlink and also may be posted to a message board. The hyperlink is added to a ticker that is displayed for viewing by other users of the system. Preferably, the stream is displayed on a website that users can access through the Internet.

Another user, USER2, then sees a question to which he would like to offer a response. Upon selecting the desired query, USER2 is prompted to select a mode of response, for example e-mail, message board post, instant message, etc. USER2 then enters his response which is sent to USER1 through the selected response mode. In addition to the selected mode, the response may also be posted to the message board where the query currently resides. By also posting to the message board, other users have the ability to review queries and the associated responses to see if any useful information already has been posted to the system.

Once USER1 receives the response, he may decide whether or not the response adequately answers his query. If so, he may elect to deactivate the hyperlink so that no further responses are sent to him. If, however, USER1 decides that additional responses are warranted, he may leave the hyperlink active so that other users can post further responses. USER1 may also maintain an open session with USER2 and continue to communicate through the selected mode.

It is also possible for users to operate in a private environment whereby their query is not posted to the message board and only appears in the ticker. Users responding to the query may also have the option of not having their response posted to the message board, but sent only to the original poster. In addition to the embodiment shown in FIG. 1, various filters and categorization schemes may be added as described herein so that users may limit their ticker only to areas in which they feel like responding.

In accordance with an embodiment of the present invention, instructions adapted to be executed by a processor to perform a method are stored on a computer-readable medium. The computer-readable medium can be a device that stores digital information. For example, a computer-readable medium includes a read-only memory (e.g., a Compact Disc-ROM ("CD-ROM") as is known in the art for storing software. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

As used to describe embodiments of the present invention, the term "coupled" encompasses a direct connection, an indirect connection, or a combination thereof. Two devices that are coupled can engage in direct communications, in indirect communications, or a combination thereof. Moreover, two devices that are coupled need not be in continuous communication, but can be in communication typically, periodically, intermittently, sporadically, occasionally, and so on. Further, the term "communication" is not limited to direct communication, but also includes indirect communication.

In this detailed description, systems and methods in accordance with embodiments of the present invention have been described with reference to specific exemplary embodiments. Accordingly, the present description and figures are to be regarded as illustrative rather than restrictive.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for posting and responding to a query within a system, comprising:
   receiving the query from a first system user;
   converting the query to a hyperlink;
   adding the hyperlink to an interactive streaming ticker of hyperlinks for response; and
   receiving a response to the query from at least one other system user by at least one of e-mail, instant message, and message board post, wherein the at least one other system user interacts with the hyperlink to respond to the query.

2. The method of claim 1, wherein the first user selects from one or more response modes.

3. The method of claim 2, wherein the one or more response modes include at least one of e-mail, message board post, and instant message.

4. The method of claim 2, wherein a second user responds by selecting a query from the ticker of hyperlink queries.

5. The method of claim 3, wherein a second user responds by selecting a query from the ticker of hyperlink queries and is prompted to select a desired response mode from the one or more response modes selected by the first user.

6. The method of claim 1, wherein the first user is connected to the system with a predetermined identification before posting the query.

7. The method of claim 1, wherein the first user is not connected to the system with a predetermined identification and is assigned an identification upon posting the query.

8. The method of claim 4, wherein the second user is connected to the system with a predetermined identification before responding.

9. The method of claim 4, wherein the second user is not connected to the system with a predetermined identification and is assigned an identification upon responding.

10. The method of claim 1, wherein the first user selects one or more categories within which the query falls.

11. The method of claim 8, wherein a second user filters the ticker by selecting one or more categories and only queries designated by the first user that fall within the second user's pre-selected categories are displayed.

12. The method of claim 1, wherein a second user filters the ticker by use of keywords.

13. The method of claim 1, wherein any user connected to the system can strike a query from the ticker.

14. The method of claim 1, wherein the query is also automatically posted to a message board.

15. The method of claim 14, wherein the method board is searchable.

16. The method of claim 4, wherein the first user deactivates the hyperlink after receiving a suitable response.

17. The method of claim 1, wherein only the most recent twenty-five queries are shown in the ticker.

18. The method of claim 4, wherein the first user adds the second user to a buddy list.

19. The method of claim 1, wherein queries are filtered for obscene language and obscene queries are removed or never posted to the ticker.

20. A method for posting and responding to a query within a system, comprising:
    receiving the query from a first system user wherein the query seeks a response from one or more other system users;
    converting the query to a hyperlink;
    adding the hyperlink to an interactive streaming ticker for response; and
    receiving a response to the query from at least one other system user by at least one of e-mail, instant message, and message board post, wherein the at least one other system user interacts with the hyperlink to respond to the query.

* * * * *